Sept. 26, 1961     H. H. PRYOR     3,001,671
ARTICLE DISPENSING APPARATUS
Filed May 12, 1958     7 Sheets-Sheet 1
FIG. I.
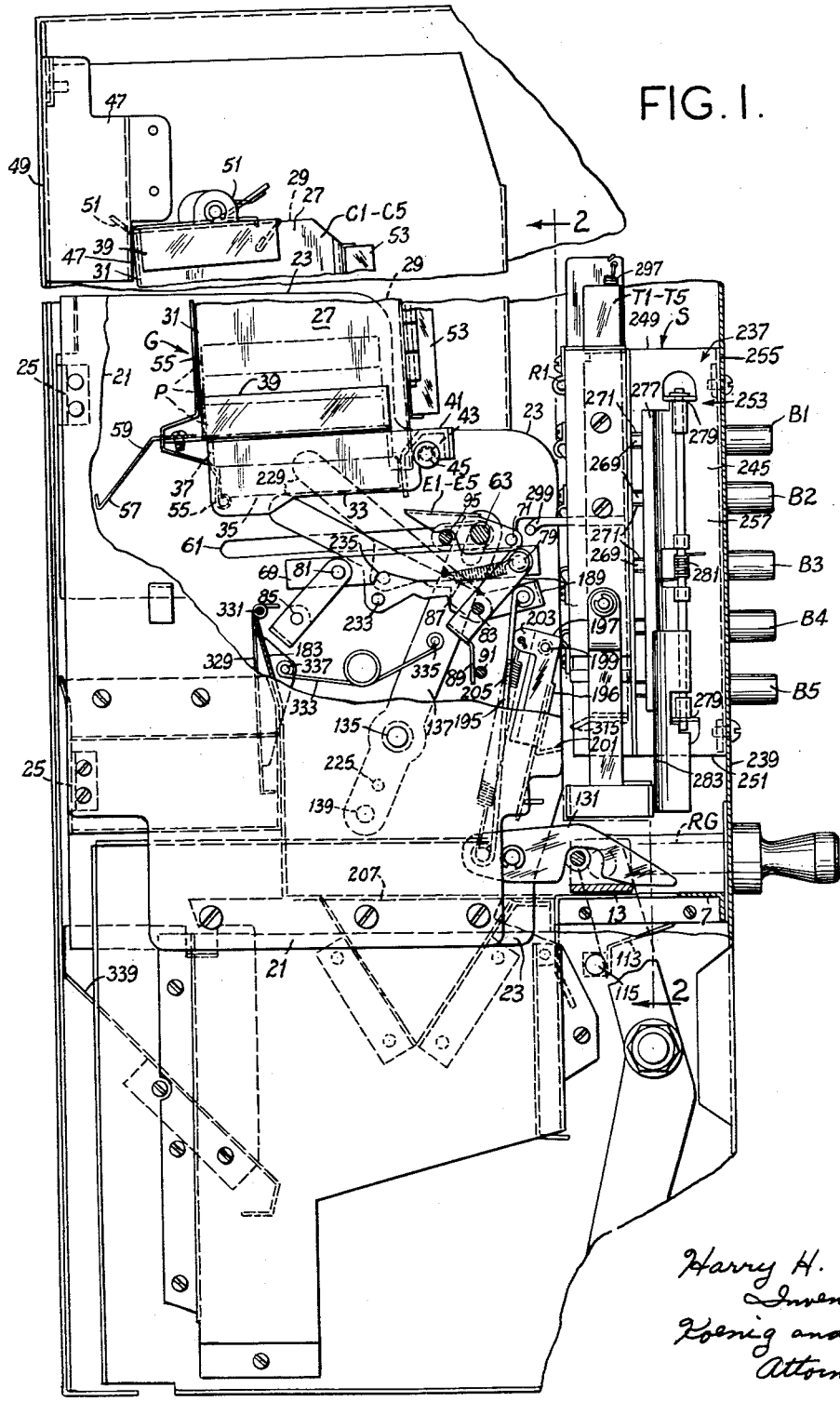

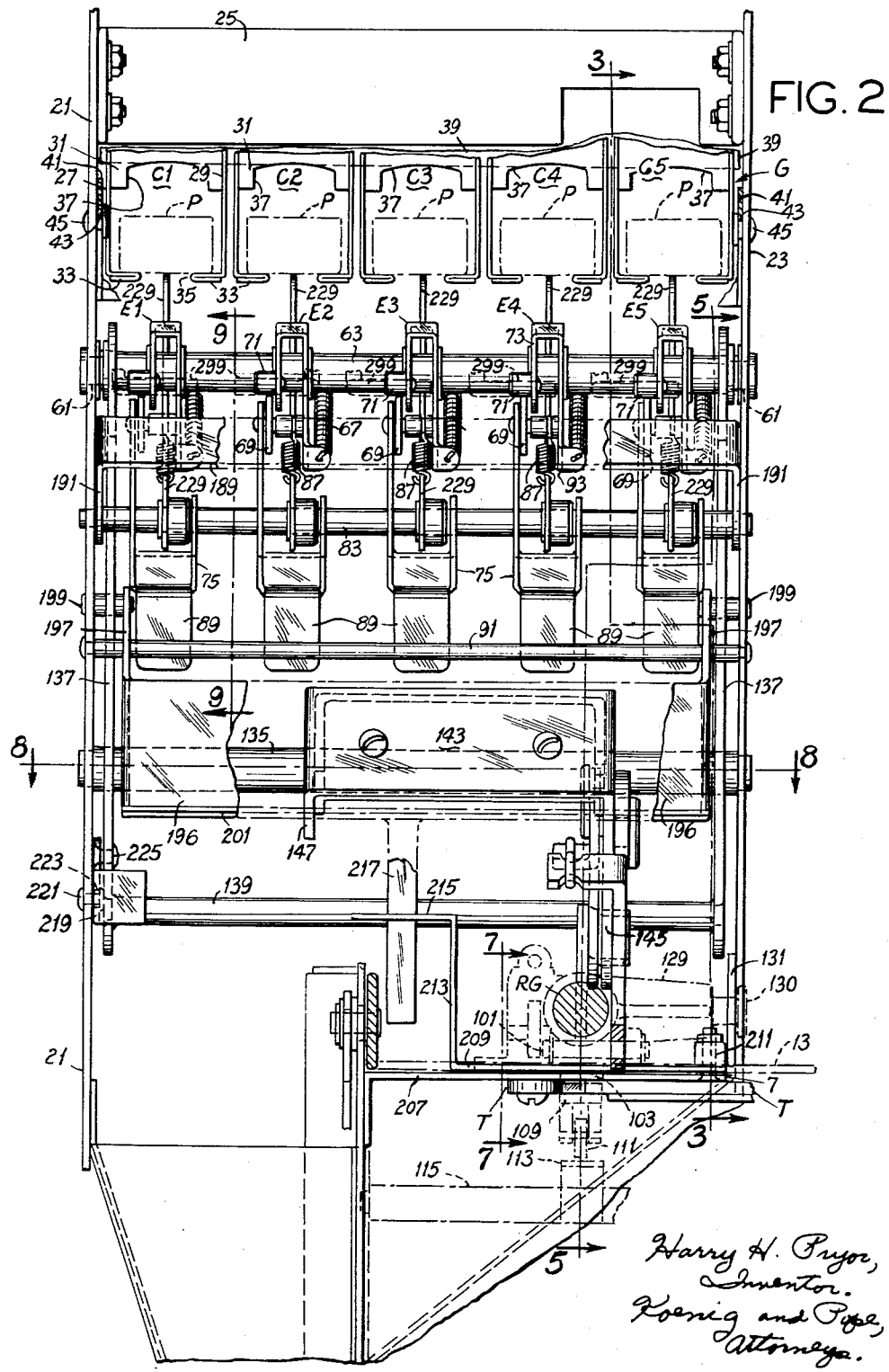

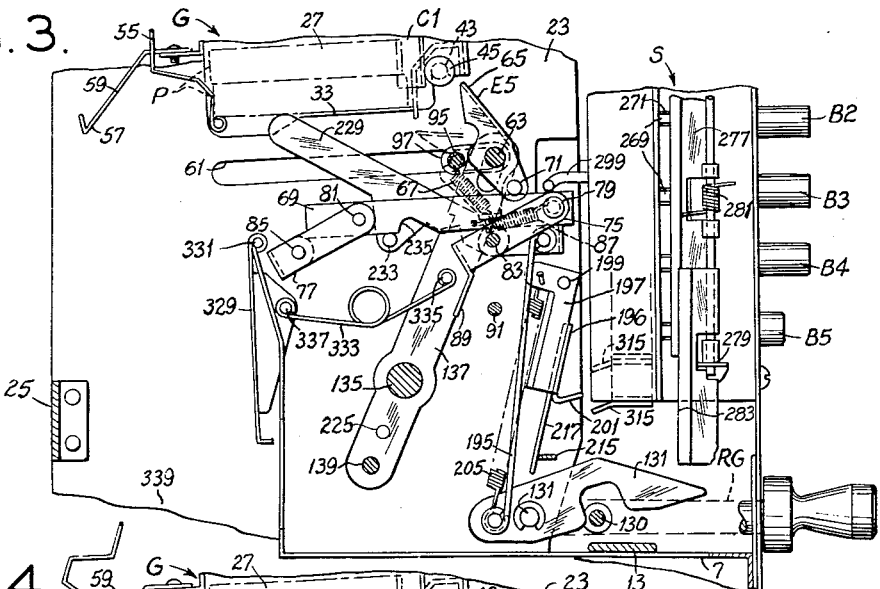

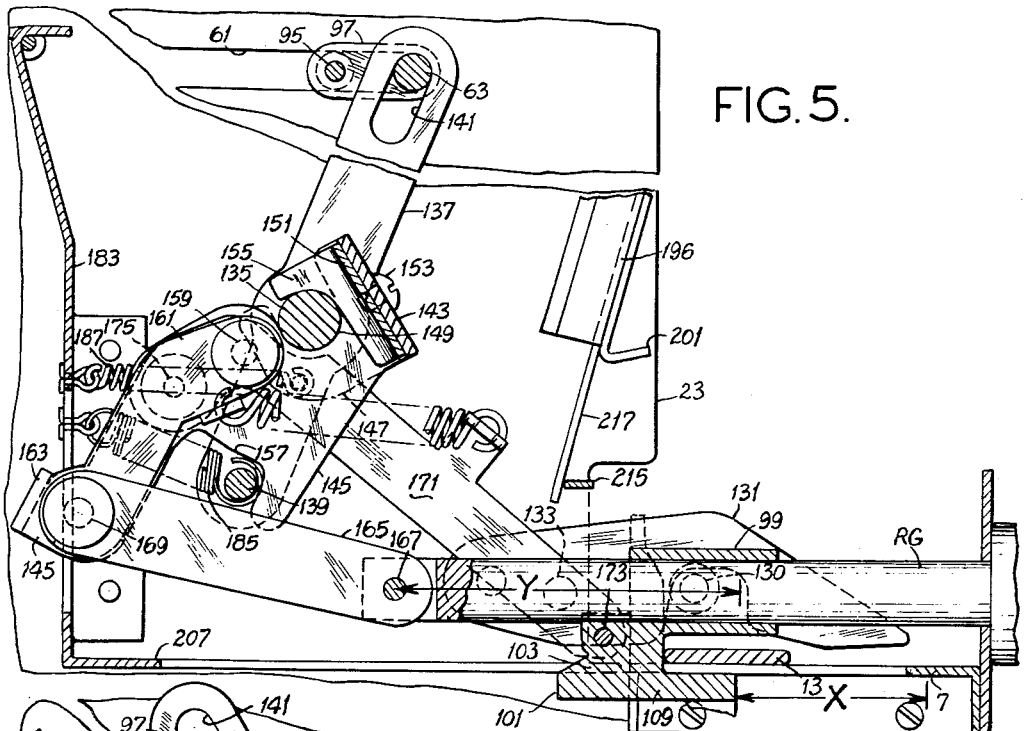
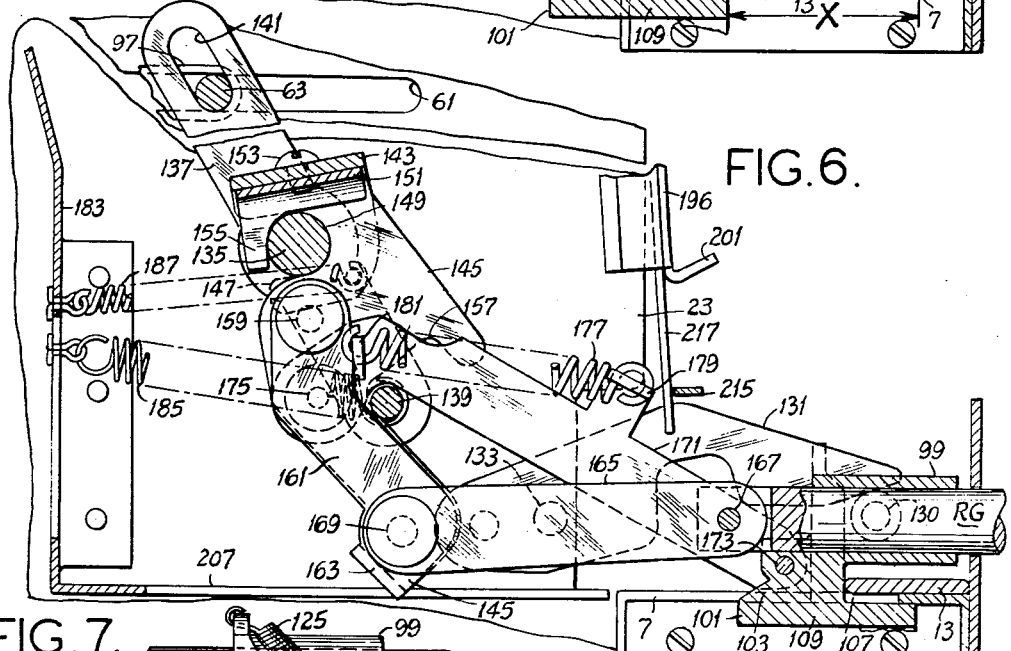
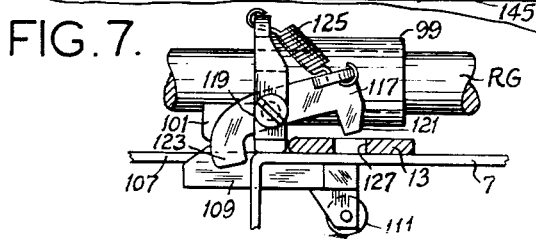

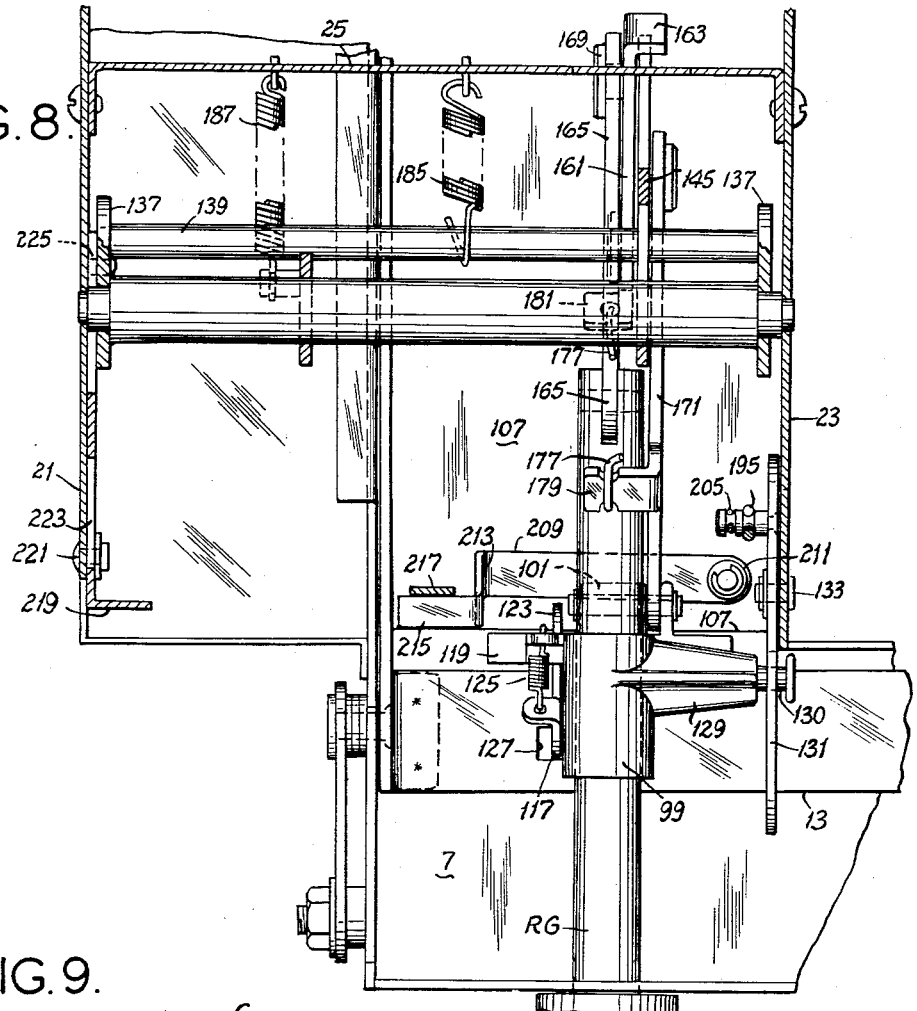
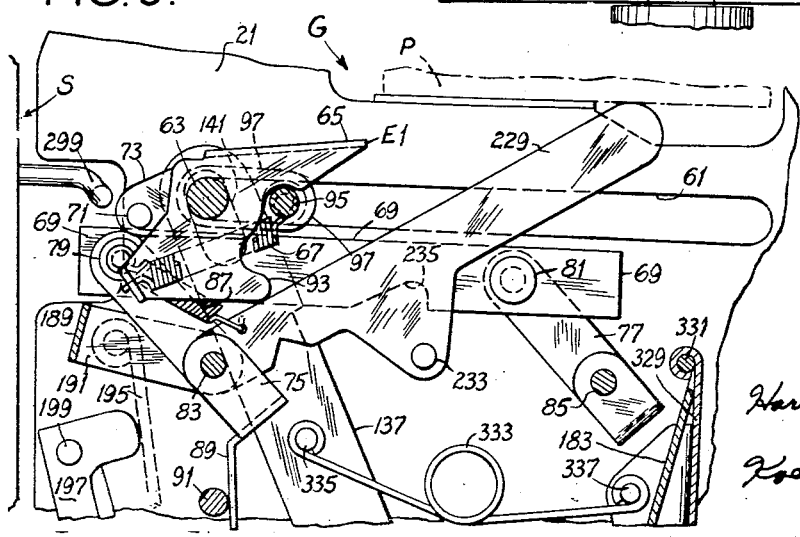

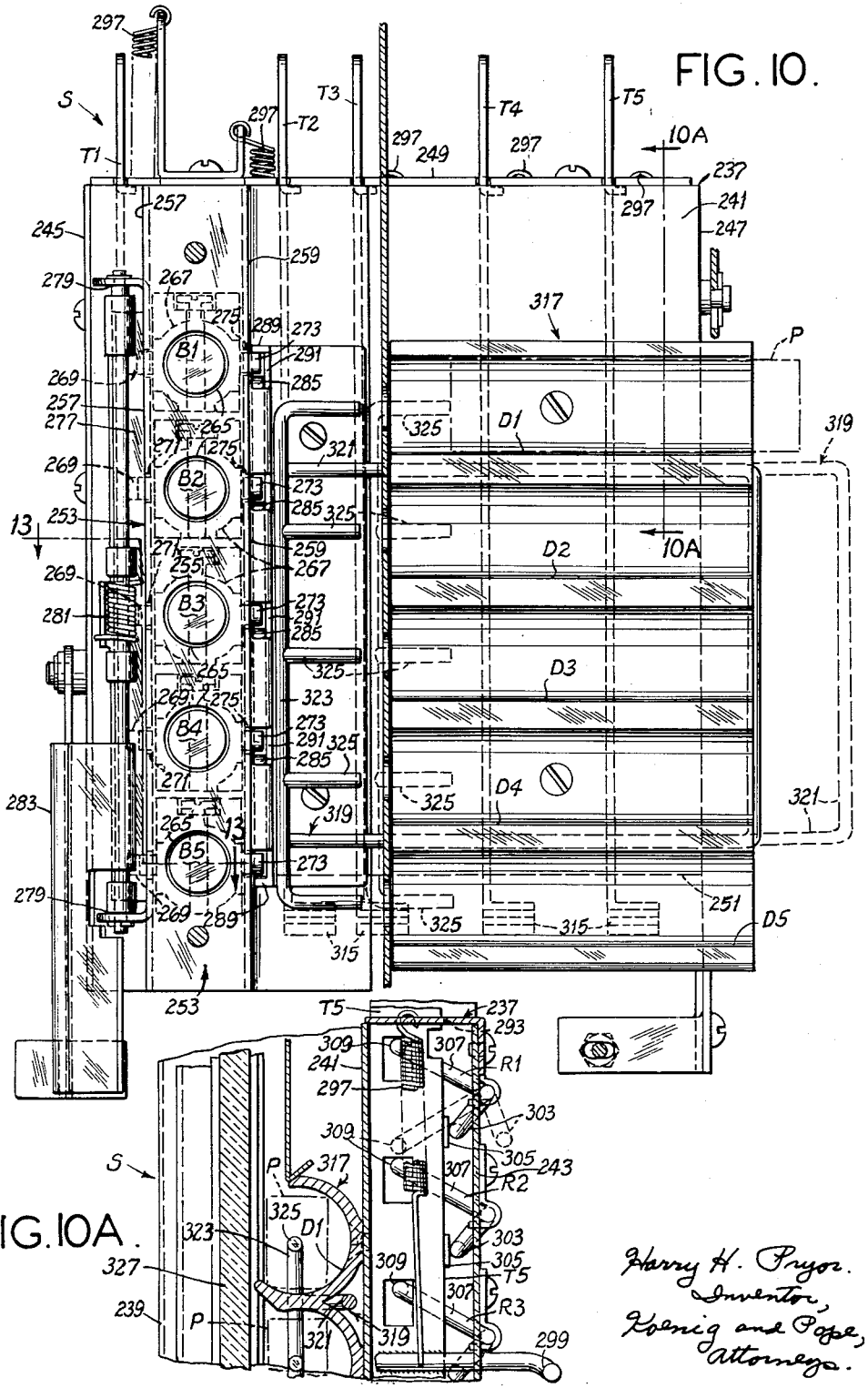

United States Patent Office 3,001,671
Patented Sept. 26, 1961

3,001,671
ARTICLE DISPENSING APPARATUS
Harry H. Pryor, St. Louis, Mo., assignor to National Vendors, Inc., St. Louis, Mo., a corporation of Missouri
Filed May 12, 1958, Ser. No. 734,693
14 Claims. (Cl. 221—125)

This invention relates to article dispensing apparatus, and more particularly to apparatus for selectively dispensing packages of gum or mints from a plurality of columns each containing a stack of packages, with different kinds of merchandise in the various columns.

Among the several objects of the invention may be noted the provision of improved apparatus of the class described in which there is a single manually operable pull-out rod and a plurality of selectors, one for each column, with the arrangement such as to provide for dispensing from any one of the columns by operating the selector for that column and then pulling out the rod; the provision of apparatus of this class particularly for incorporation in a candy vending machine of a type such as is shown in the copending coassigned application of Benjamin W. Fry, Serial No. 386,283, filed October 15, 1953, entitled Coin Apparatus, issued as Patent No. 2,858,921, November 4, 1958, utilizing the draw bar of the vending machine for control of the apparatus; the provision of apparatus of this class which is so constructed that the stroke of the pull-out rod for the apparatus is substantially greater than the stroke of the draw bar, to reduce the force required to pull out the pull-out rod; the provision of apparatus of this class with means for precluding operation if the column corresponding to the chosen selector is empty; and the provision of apparatus of the class described which is reliable and foolproof in operation. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a left side elevation of a gum and mint unit of this invention incorporated in a vending machine of a type such as shown in said Fry Patent 2,858,921, with parts broken away and parts shown in section;

FIG. 2 is an enlarged vertical transverse section taken on line 2—2 of FIG. 1, with parts broken away;

FIG. 3 is a vertical section on the same scale as FIG. 1, taken on line 3—3 of FIG. 2, and showing certain parts in a moved position as compared with FIG. 1;

FIG. 4 is a section corresponding to FIG. 3 showing certain parts in a moved position as compared with FIG. 3;

FIG. 5 is a section taken on line 5—5 of FIG. 2;

FIG. 6 is a section corresponding to FIG. 5 showing certain parts in a moved position as compared with FIG. 5;

FIG. 7 is a section taken on line 7—7 of FIG. 2;

FIG. 8 is a horizontal section taken on line 8—8 of FIG. 2;

FIG. 9 is a vertical section taken on line 9—9 of FIG. 2;

FIG. 10 is a front elevation of a selector subassembly of the unit;

FIG. 10A is a vertical section taken on line 10A—10A of FIG. 10;

FIG. 13 is a horizontal section taken on line 13—13 of FIG. 10, illustrating a rearward position of certain parts; and FIG. 14 is a view similar to FIG. 13 illustrating a moved position of parts as compared with FIG. 13.

Corresponding reference characters indicate corresponding parts throughout the several views of the drawings.

Figure 11:
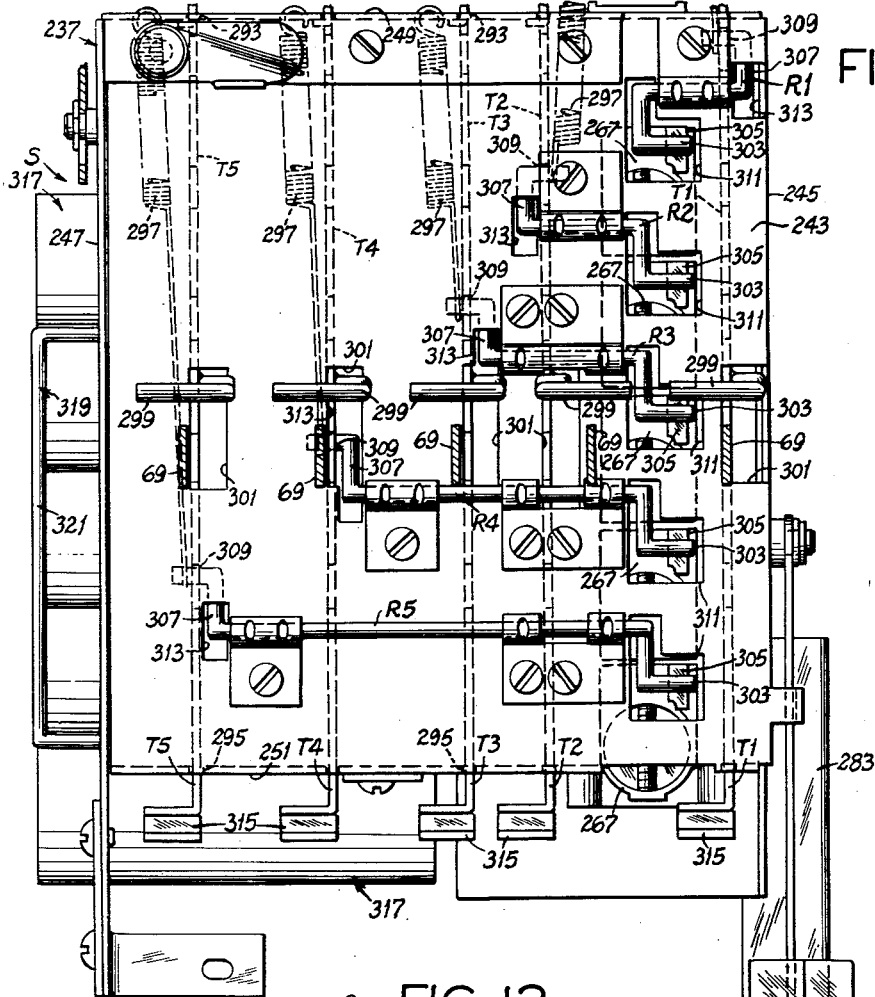
FIG. 11 is a rear elevation of the selector subassembly of FIG. 10.

Referring to the drawings, there is indicated at G a gum and mint dispensing apparatus of this invention which is incorporated as an auxiliary dispensing unit in a candy vending machine of the type shown in said Fry patent. The candy vending machine comprises left and right side walls, with magazines or columns in the space between the walls, and a horizontal plate 7 (which appears in FIGS. 1–8 herein) extending between the side walls. On this plate 7 is a draw bar 13 (which also appears in FIGS. 1–8 herein) extending from one side wall of the vending machine to the other. This draw bar is slidable on the plate 7 transversely with respect to its own length, and in forward and rearward direction with respect to the apparatus. As will be understood by reference to said Fry patent, the candy vending machine has a plurality of manually operable primary pull-out rods (designated 23 in said Fry patent) each of which has a head (designated 27 in said patent) engageable with the draw bar, whereby, upon pulling out any one of the rods, the draw bar 13 is pulled forward.

In accordance with this invention, the left-hand column of the candy vending machine is removed to accommodate the auxiliary gum and mint unit G, and the left-hand pull-out rod, specially designated RG herein, is utilized, with modifications as to its construction and association with the draw bar 13, to operate the unit G. In this respect, it is to be observed that the draw bar 13 and the rods of the candy machine are reciprocable through a relatively short stroke (i.e., the limited range of movement of the draw bar 13 which will be most apparent from a consideration of the draw bar positions of FIGS. 5 and 6 herein). The auxiliary rod RG, in the adaptation for operating the auxiliary unit G, is associated with the draw bar 13 in such manner as to have a substantially longer stroke than the draw bar. This longer stroke is provided in order to reduce the force required to pull out the rod RG, so that it will not be too difficult for a purchaser to pull it out.

The gum and mint unit G comprises a plurality of side-by-side upright magazines or columns (see FIGS. 1 and 2) each adapted to hold a stack of packages P of gum or mints. Five magazines or columns are shown, designated C1 to C5. For each column there is an ejector adapted to push the lowermost package P out of the column to the rear. The five ejectors are designated E1 to E5 (see FIG. 2). Each is adapted for movement between a lowered retracted position such as illustrated in FIGS. 1 and 9 and a raised ejecting position such as illustrated in FIGS. 3 and 4. Upon pulling out the rod RG, all the ejectors are moved rearward in unison. For each column there is a push button operable to raise the respective ejector to ejecting position, the five push buttons being designated B1 to B5 (see FIGS. 1 and 10). Thus, when button B1 is pushed in, the ejector E1 for column C1 is raised, and then when rod RG is pulled out, ejector E1 ejects a package from column C1. When button B2 is pushed in, ejector E2 for column C2 is raised, and then when rod RG is pulled out, ejector E2 ejects a package from column C2. Operation for the other buttons and ejectors is similar.

The unit G comprises left and right main side walls 21 and 23 held in assembled relation by tie-bars such as indicated at 25. Any suitable construction may be used for columns C1–C5. As shown, each column C1–C5 comprises a sheet metal blank bent to have side walls 27 and 29, a back wall 31, and inturned bottom flanges 33. These flanges define a front-to-rear bottom slot 35. The back wall 31 terminates above the flanges 33 a distance somewhat greater than the height of a package P to provide a rear exit opening 37 for the lowermost of a stack of packages P supported by the flanges. The five columns C1–C5 are held in assembly side-by-side by suitable straps such as indicated at 39 in FIGS. 1 and 2. At the lower end of the column assembly is a bracket 41 provided with notches such as indicated at 43. Studs 45 on the side walls 21 and 23 are engageable in these notches to support the column assembly. The column assembly leans slightly rearward against a back rest 47 on the back wall 49 of the vending machine cabinet, and suitable latch means such as indicated at 51 is provided on the top of the column assembly for latching it to the back rest. The columns are open at the front for front loading, and a hinged door such as indicated at 53 is provided for closing the fronts of the columns. For each column, there is a spring wire 55 which bears against the rear end of the package P being ejected, and which yields rearward as the package is pushed rearward. A deflector plate 57 is mounted on the back of the column assembly, the deflector plate being angled downward to deflect the rearward end of an ejected package downward. This plate has front-to-rear slots such as indicated at 59 accommodating the spring wires 55. The detail of the columns is not critical; various suitable constructions may be used.

The main side walls 21 and 23 have front-to-rear slots 61, which are inclined slightly downward from front to rear consistent with the inclination of the packages P in the leaning colums C1–C5. An ejector shaft 63 spans the side walls, its ends extending through the slots 61 and being slidable therein. The ejector shaft 63 is slidable in the slots 61 from a retracted position at the forward ends of the slots (see FIGS. 3 and 9) toward the rear of the unit G in a plane below the column assembly C1–C5. The shaft 63 constitutes a carrier for the ejectors E1–E5, these being pivotally mounted side-by-side on the shaft. The ejectors are identical, each consisting of a sheet metal stamping having a nose portion 65 to the rear of shaft 63 adapted to swing between a lowered retracted position (see FIG. 9) below the respective column C1–C5 and a raised position (see FIGS. 3 and 4) wherein it is adapted to engage the forward end of the loweremost package P in the respective column to push this package rearward upon rearward movement of the shaft 63. Each ejector E1–E5 is biased by a spring 67 to swing clockwise as viewed in FIGS. 1, 3 and 4 (counterclockwise as viewed in FIG. 9) for upward movement of its nose portion 65 to the stated raised package-ejecting position. Each ejector E1–E5 is normally maintained in its lowered retracted position against this bias by means of a horizontal ejector positioning bar 69 engageable with a stud 71 on a forward extension 73 of the ejector. There are five positioning bars 69, one for each of the ejectors. Each one of bars 69 is mounted for movement between a raised position in which it holds the respective ejector down in retracted position (see FIG. 9) and a lowered position in which the respective ejector is released for movement by spring 67 to ejecting position (see FIGS. 3 and 4) by means of forward and rearward parallel bars 75 and 77 pin-connected at their upper ends to the bar 69 as indicated at 79 and 81, and having their lower ends pivotal on forward and rearward rods 83 and 85 having their ends mounted in the main side walls 21 and 23.

Each bar 69 is biased to move upward to its raised position by a spring 87. The raised position of each bar 69 is determined by the engagement of a tang 89 on the associated link 75 with a stop rod 91 extending between the side walls 21 and 23. The raised ejecting position of each ejector E1–E5 is determined by engagement of an arm 93 on the ejector with a rod 95. This rod 95 extends between the side walls 21 and 23, its ends being slidable in the slots 61 and being linked to the ejector shaft 63 by means of links 97, whereby rod 95 moves rearward and forward with the ejector shaft. Springs 67 are connected to rod 95.

The pull-out rod RG extends slidably through a tubular guide 99 on a draw bar pusher 101 adjacent the left end of the draw bar 13 (see FIGS. 5, 6 and 7). The pusher 101 is engageable with the rearward edge of the draw bar and upon forward movement of the pusher, the draw bar is pushed forward. The pusher 101 has a vertical web 103 which extends down through a slot 107 in the plate 7. At the bottom of the web 103 below the plate 7 is a horizontal flange portion 109, the forward end of which is engageable with the left-end tumbler of a series of interlock tumblers T (such as are shown at 39 in U.S. Patent 2,823,782) to prevent the pull-out rod RG from being pulled out simultaneously with any of the other rods of the vending machine (see FIGS. 1 and 2). Flange portion 109 carries a roller 111 for engagement with an arm 113 on a price shaft 115 for coaction with coin mechanism (not shown herein) on the right side wall of the vending machine. A lever 117 pivoted at 119 on the draw bar pusher has downwardly extending fingers 121 and 123 at its forward and rearward ends (see FIG. 7). This lever is biased by a spring 125 to rock counterclockwise as viewed in FIG. 7 to a position wherein the forward finger 121 is above the draw bar. When the pusher 101 moves forward, the rearward finger 123 engages the plate 7, and the lever 117 is rocked clockwise as viewed in FIG. 7 for entry of finger 121 in an opening 127 in the draw bar. The pusher 101 has a laterally extending arm 129 having a stud 130 at its end (see FIG. 8) adapted when the pusher is in the rearward retracted position of FIG. 5 for latching engagement by a latch lever 131 pivoted at 133 on the right-hand main side wall 23.

Extending between the main side walls 21 and 23 is a rock shaft 135. Fixed on this shaft, adjacent the side walls and on the inside thereof, are end arms 137. The lower ends of these end arms are tied together by a crossbar 139. The end arms, at their upper ends, have elongate slots as indicated at 141 receiving the ejector shaft 63. Pivoted on the rock shaft 135 is a sheet metal stamping comprising a strap 143 having a long arm 145 extending from one end thereof at right angles thereto, and a short arm 147 extending from its other end at right angles thereto. Arms 145 and 147 have notches 149 receiving the shaft 135, and the stamping 143, 145, 147 is held on the shaft, while being rotatable relative to the shaft, by means of a retainer 151 fastened to the inside of strap 143 by screws 153 and having end portions 155 engaging the shaft 135 for holding the stamping on the shaft.

The long arm 145 is hereinafter referred to as the ratio arm. It has a downwardly opening notch at 157 through which extends the crossbar 139 (see FIGS. 5 and 6). Pivoted on the ratio arm 145 at 159 is a lever 161. This lever has a finger 163 at its lower end engageable behind the rearward edge of the ratio arm 145 at the lower end of the ratio arm. A drag link 165 is pin-connected as indicated at 167 at its forward end to the rearward end of the pull-out rod RG, and pin-connected at its rearward end as indicated at 169 to the lower end of the lever 161. A pusher link 171 is pin-connected at its forward end as indicated at 173 to the draw bar pusher 101, and pin-connected at its rearward end as indicated at 175 to the ratio arm 145, this link 171 extending over the crossbar 139. A tension spring 177 is connected between ears 179 and 181 on link 171 and lever 161. Extending between the side walls 21 and 23 rearward of the rock shaft 135 is a fixed vertical transverse partition 183. A spring 185 is connected at one end to the partition and at its other end to the crossbar 139 for biasing the arms 137 to rotate clockwise as viewed in FIGS. 5 and 6 thereby to bias the ejector shaft 63 forward to its retracted position of FIGS. 1, 3 and 9. A spring 187 is connected at one end to the partition and at its other end to the short arm 147 of stamping 143, 145, 147 for biasing the ratio arm 145 to rotate clockwise as viewed in FIGS. 5 and 6.

Extending under the forward ends of the ejector positioning bars 69 is a latch-operating bar 189 having end arms 191 pivoted on rod 83. A link 195 connects the right-hand end arm 191 and the latch lever 131 in such manner that when bar 189 is swung down by downward movement of any one of the bars 69, the latch lever 131 is raised out of engagement with the stud 130. Extending between the side walls 21 and 23 at the front thereof is a plate 196 having upwardly extending arms 197 pivoted as indicated at 199 to the side walls 21 and 23. The plate 196 hangs down from the pivots 199 and at its lower edge has a forwardly extending flange 201. The right-hand arm 197 has a rearwardly directed extension 203. A tension spring 205 is connected between this extension and latch lever 131. A horizontal shelf 207 extends forward from the lower edge of partition 183 to the plate 7. A lever 209 is pivoted at 211 on shelf 207 for swinging on a vertical axis. Lever 209 is engageable with the rear end of draw bar pusher 101, and has an upwardly extending arm 213 at its free end and a horizontal finger 215 at the upper end of arm 213. Plate 196 has an arm 217 extending down behind the finger 215. Spring 205 biases the latch lever 131 to swing downward to latching position. It biases latch-operating bar 189 to swing upward. It biases plate 196 to swing forward. Engagement of finger 215 with arm 217 holds the plate 196 in the rearward retracted position in which it is shown in FIGS. 3 and 5. When the draw bar 101 moves forward, lever 209 is released to move forward, and plate 196 swings forward to the operative position in which it is shown in FIGS. 4 and 6.

A slide 219 is guided for generally horizontal sliding movement on the inside of the left side wall 21 by means of a stud 221 extending through a slot 223 in the slide. The rearward end of this slide 219 is pin-connected at 225 to the left end arm 137, and the slide 219 moves forward when arms 137 rotate through an ejecting stroke from the FIGS. 3 and 5 position to the FIGS. 4 and 6 position.

Means is provided for locking any one of ejectors E1-E5 out of operation if the respective column C1-C5 should be empty. As shown best in FIGS 2-4 and 9, this means comprises an empty lockout lever 229 associated with each column. These levers are all pivoted on the rod 83 for swinging movement in the vertical planes of the column bottom slots 35. Each lever is biased to swing upward into the respective column by the same spring 87 as used for the respective bar 69. Each lever has a stud 233 adapted in a raised position of the lever to be positioned in a notch 235 in the respective bar 69. Any lever is adapted to swing up to this raised position if the respective column is empty. As long as there is merchandise in a column, the lever will be held down in retracted position such as shown in FIG. 9 with the respective stud 233 below the respective bar 69 and out of notch 235. With any stud 233 in notch 235 of the respective bar 69, the latter is held against swinging down.

The push buttons B1-B5 are part of a selector subassembly S comprising a sheet metal case 237 mounted on the inside of the door 239 of the vending machine cabinet in front of the mechanism contained between side walls 21 and 23. This case has front and back walls 241 and 243, left and right side walls 245 and 247, and top and bottom walls 249 and 251 (see FIGS. 10–12). Mounted on the front wall 241 of the case 237 and extending vertically adjacent the left side of the case is a button housing 253 of U-shape in horizontal cross section. The front of this housing is designated 255, its left side is designated 257, and its right side is designated 259. The sides have flanges 261 and 263 secured as by spot welding to the front wall 241 of the case 237. The front 255 of housing 253 has five holes each designated 265 in a vertical array. The buttons B1-B5 extend out through these holes and through holes in the door 239. Each button extends from a slide 267 constituted by a metal casting. If desired, each button may be yieldingly mounted in the respective slide, acting against a compression spring (not shown) in the slide so that if the button is pushed in the slide cannot move, the button will yield slightly. This is not essential. Each slide has a hook 269 on its left side slidable in a horizontal slot 271 in the left side 257 of the housing 253, and a lug 273 on its right side slidable in a horizontal slot 275 in the right side 259 of the housing.

The slides 267 and buttons B1-B5 are biased to slide in forward direction (by spring means to be described) to a forward retracted position determined by the engagement of the forward ends of the slides with the front 255 of the housing 253. Each slide and button is individually movable rearward from the stated retracted position to a rearward operative position, in which it becomes latched by engagement with the hook 269 thereon with a latch plate 277 hinged as indicated at 279 on the left side 257 of the housing 253 and biased toward latching position by a spring 281. Latch plate 277 has an angled release arm 283 engageable by the previously mentioned slide 219 when the latter moves forward. Interlock means is provided to prevent more than one of buttons B1-B5 from being completely pushed in at a time, comprising a series of slidable interlock tumblers 285 accommodated in a retainer 287 on the right side 258 of housing 253. The retainer 287 has upper and lower end flanges 289 acting as tumbler stops, and slots 291 for entry of lugs 273 on the slides 267. The combined length of the tumblers 285 is less than the distance between stops 289 by the thickness of one lug 273. When any button B1-B5 is completely pushed in, the lug 273 on the respective slide 267 enters between two of the tumblers 285 and spreads the tumblers apart to prevent the lug 273 on any other one of the slides 267 from moving rearward. As appears in FIGS. 12 and 14, some inward movement of each button is permitted before the respective lug 273 reaches the tumblers.

The selector subassembly S further comprises five vertically slidable bars T1-T5 for operating the respective positioning bars 69 for the respective ejectors E1-E5. These bars T1-T5 are guided for vertical sliding movement in slots 293 and 295 in the top and bottom walls 249 and 251 of the case 237. Each of bars T1-T5 is biased upward by a spring 297. Each of bars T1-T5 carries a finger 299 for engagement with the respective lift bar 69. These fingers extend through vertical slots 301 in the back wall of the case. Pivoted on the outside of the back wall of the case are operating rods R1-R5 for the respective bars T1-T5. Each of rods R1-R5 consists of a length of stiff wire bent at one end to provide a crank arm 303 for engagement by a rearward extension 305 on the respective slide 267 and bent at its other end to provide a crank arm 307 which has a pivotal connection with the respective one of bars T1-T5 as indicated at 309. Opening 311 and 313 are provided in the back wall 243 of the case 237 for passage of the extensions 303 and 307 of the crank arms. Each bar T1-T5 has a foot 315 at its lower end below the bottom wall of the case 237 engageable with the flange 201 of plate 196 when the latter is swung forward.

Mounted on the front wall 241 of case 237 to the right of housing 253 is a package display member 317 constituted by an aluminum extrusion formed to provide five horizontal package-holding recesses D1-D5 which are generally horizontally aligned with buttons B1-B5. A package of the merchandise in column C1 is placed in recess D1 to indicate that button B1 is to be pushed to obtain this brand of merchandise; a package of the merchandise in column C2 is placed in recess D2 to indicate that button B2 is to be pushed to obtain this brand; and similarly for recesses D3–D5. To enable packages to be readily removed from the recesses, a package pusher 319 is provide, comprising a slidable C-shaped frame 321 carrying a bar 323 having pusher fingers 325 adapted, upon sliding the frame to the right, to engage the left ends of packages in the recesses and push the packages toward the right. A window 327 is provided in the door 239 for viewing the packages carried by member 317.

A gate 329 is pivoted at the upper edge of partition 183 as indicated at 331, being located in the rear of the partition. A spring link 333 has one end connected as indicated at 335 to the right-hand end arm 137 and its other end connected as indicated at 337 to the gate. When the end arm is in its retracted position of FIG. 3, the gate 329 occupies a retracted position hanging down in the rear of the partition 183. When the end arm 137 swings counterclockwise as viewed in FIGS. 3 and 4, the gate swings up to a generally horizontal position (see FIG. 4) to receive a package P being ejected from any of columns C1–C5. Then when the end arm 137 swings back to retracted position, the gate swings down to dump the package into a chute 339 through which it falls into the receiver of the vending machine (indicated at 5 in said Fry Patent 2,858,921).

As incorporated in a vending machine of the type shown in said Fry patent, the gum and mint unit G of this invention is subject to being locked out of operation by means for locking the draw bar 13 from moving forward more than a limited distance comprising the coin-controlled stop of the vending machine (indicated at 85 in said patent) and the lever (indicated at 63 in said patent) engageable with this stop. All five varieties of merchandise stocked in the gum and mint unit are of the same price (five cents, for example) and the coin-control unit of the machine is adapted, upon insertion of coin (a nickel) in the amount of said price and pulling out the rod RG for positioning the stop in non-locking position to permit full-stroke operation of rod RG.

Operation is as follows:

To obtain an item from column C5, for example, the purchaser pushes in button B5 (see FIGS. 3, 4 and 13), deposits coin in the amount of the price of the item (a nickel, for example), and then pulls out the rod RG. Pushing in the button B5 results in rearward movement of the lowermost slide 267 to its rearward position such as illustrated in FIG. 13, in which it becomes locked by reason of engagement of latch plate 277 in front of the hook 269 on the slide. Entry of the lug 273 on this slide between the lowermost interlock tumbler 285 and the lower end flange 289 of tumbler retainer 287 locks the other buttons B1–B4 out of operation. Rearward movement of the lowermost slide 267 results in rotation of rod R5 to effect downward movement of bar T5. The finger 299 on this bar T5 depresses the ejector positioner bar 69 associated with ejector E5 for column C5 (assuming there is merchandise in column C1), and ejector E5 thereupon swings up to its ejecting position under the bias of its spring 67 (see FIG. 3). The stated bar 69, in moving downward, swings the latch-operating bar 189 downward, and bar 189 acts through the link 195 to raise the latch lever 131 out of engagement with the stud 130 on the draw bar pusher 101 to free this pusher for movement (see FIG. 3).

On pulling out the rod RG, link 165, connected between the rod RG and the lever 161, acts through the engagement of finger 163 on lever 161 with the rearward edge of the ratio arm 145 to swing this arm counterclockwise from its retracted FIG. 5 position. As arm 145 swings counterclockwise, the edge of arm 145 at the rear of the notch 157 engages the crossbar 139 to swing the arms 137 counterclockwise as viewed in FIG. 5. Also, as arm 145 swings counterclockwise, link 171 is driven forward to push the pusher 101 and the draw bar 13 forward. Since the distance from the axis of rotation of the ratio arm 145 (the axis of shaft 135) to the pin-connection 175 for link 171 is less than the distance from this axis to the effective point of connection at finger 163 of link 165 to the ratio arm, the pin-connection 175 travels forward less than the connection 163, whereby the stroke of the pusher 101 and the draw bar 13 is less than the stroke of the rod RG. The stroke of the pusher 101 and the draw bar 13 is indicated at X and the stroke of the rod RG is indicated at Y in FIG. 5. As shown, stroke Y is approximately 1.8 times stroke X.

Arms 137, swinging counterclockwise from the retracted position of FIGS. 3 and 5 to the position of FIGS. 4 and 6, push the ejector shaft 63 and all the ejectors E1–E5 thereon rearward to the position shown in FIGS. 4 and 6. Only ejector E5 is raised, and as it moves rearward with shaft 63 it pushes the lowermost package P out of column C5 (see FIG. 4). The gate 329 swings up to receive this package (see FIG. 4). The left-hand arm 137, as it swings, drives the slide 219 forward from its FIG. 8 position. Slide 219 engages the release arm 283 of latch plate 277 and swings the latter to release the hook 269 of the B5 slide 267 (see FIG. 14). The button B5 and the B5 slide 267 thereupon snap out to their forward retracted position under the bias of the spring 297 for bar T5, the latter returning upward to its raised retracted position. As the draw bar pusher 101 moves forward, lever 209 swings forward, allowing plate 196 to swing forward. The flange 201 on plate 196 swings over the foot 315 of bar T5 and under the feet 315 of bars T1–T4. This holds bar T5 down and keeps bars T1–T4 from moving down.

Upon return of the rod RG back to retracted position after it has been pulled out, all the parts return to their retracted positions. The gate 329 swings down and dumps the package thereon into the chute 339 for delivery to the purchaser.

To obtain an item from any one of columns C1 to C4, the purchaser pushes in button B1, B2, B3 or B4, as the case may be, and then pulls out rod RG, the operation being similar to that above described for obtaining an item from column C5, except that buttons B1–B4 actuate bars T1–E4, respectively, and bars T1–T4 actuate the positioners 69 for ejectors E1–E4, respectively.

Figure 12:
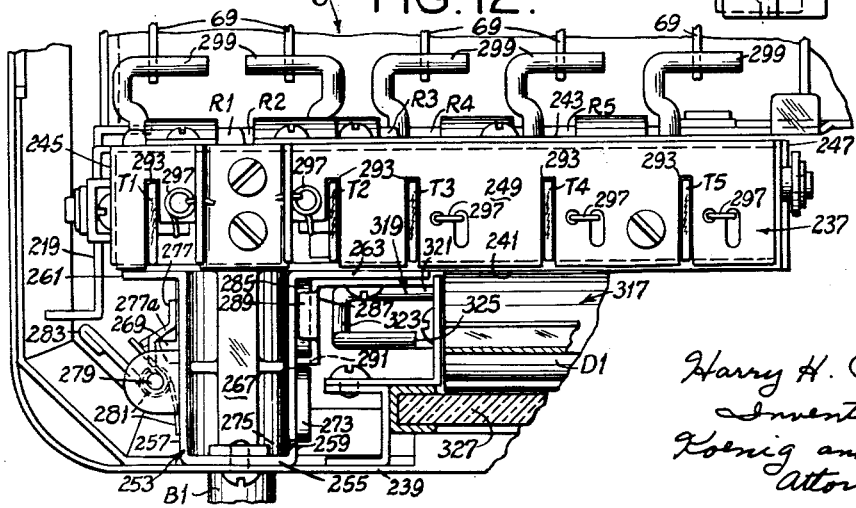
FIG. 12 is a plan view of the selector subassembly, with parts broken away, and showing part of the cabinet in which the unit is housed.

A desirable feature of the apparatus of this invention is that if a customer has pushed in one of the buttons B1–B5, and then wishes to change his selection, he may push in another button and release the first button. Assuming, for example, that a customer has pushed in button B5, as above described, and that this button B5 has been locked in its rearward position as illustrated in FIG. 13 by engagement of latch plate 277 in front of hook 269 on the slide 267 from which button B5 extends. Latch plate 277 has an angled step 277a as shown in FIGS. 12–14 which swings in behind the hooks 269 on the other slides 267 when the latch plate 277 swings into its latching position of FIG. 13. Now, when the customer pushes in another button, such as B4, the hook 269 on the slide 267 for this button immediately engages the angled step 277a of the latch plate 277 and swings the latch plate 277 out somewhat past its FIG. 14 position, thereby releasing the hook 269 on slide 267 for button B5 to allow the latter to snap out, and to allow button B4 to be pushed all the way in and become latched in by engagement of the hook 269 on slide 267 for button B4 with the latch plate 277. It will be observed from FIG. 14 that each button may be pushed in to some extent before lug 273 on the associated slide 267 reaches the interlock tumblers 285. This movement is sufficient for release of latch plate 277 in the manner described when changing the selection.

If any of columns C1–C5 should be empty, the empty lockout lever 229 for that column will occupy a position such as shown in dotted lines in FIG. 1, with the stud 233 on this lever entered in the notch 235 in the respective ejector positioner bar 69. This prevent this bar 69 from swinging forward and downward. Accordingly, any effort to push in the button for the empty column will be ineffective to swing down the respective bar 69, and latch lever 131 will remain down to lock the draw bar pusher 101 from moving forward. Since the draw bar pusher 101 is coupled to the ratio arm 145 by link 171, arm 145 cannot swing forward, and thereby holds lever 161, link 165 and rod RG from moving forward. The purchaser may then obtain return of his coin.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Article dispensing apparatus comprising a pair of side walls, article ejector means slidable forward and rearward between said side walls, a rock shaft extending between said side walls below said ejector means, arms on said rock shaft having a connection with said ejector means for moving the latter upon rocking of the rock shaft, a draw bar at the front of said side walls movable forward and rearward, a pusher for pushing the draw bar forward, a manually operable pull-out rod extending slidably through the pusher, a ratio arm on said rock shaft, a first link connecting the pull-out rod and said ratio arm, and a second link connecting the ratio arm and the pusher, the connection of the second link to the ratio arm being nearer the axis of the rock shaft than the connection of said first link to the ratio arm.

2. Article dispensing apparatus comprising a pair of side walls, a plurality of columns for holding stacks of articles, said columns being located side-by-side and mounted with their lower ends between said side walls, said side walls having slots therein in a plane below the lower ends of the columns, a shaft having its ends extending through the slots and slidable therein away from and back to a forward retracted position at the forward ends of the slots, a plurality of ejectors, one for each column, each pivotally mounted on said shaft for swinging movement between a lowered retracted position below the respective column and a raised ejecting position wherein it is engageable with the lowermost article in the respective column to push said article rearward out of the column upon rearward movement of the shaft, means for biasing each ejector to its raised ejecting position, a plurality of ejector positioning bars, one for each ejector, pivoted links mounting said bars for swinging movement with said bars remaining generally horizontal between a raised position and a lowered position, each bar being engageable with the respective ejector and, when in raised position, holding the respective ejector in retracted position against its bias, means including a plurality of selectors, one for each bar, each operable for swinging the respective bar downward to its lowered position, a rock shaft extending between said side walls below said ejector shaft, arms on said rock shaft having a connection with said ejector shaft for moving the latter upon rocking of the rock shaft, a manually operable pull-out rod, and means connecting said rod to said rock shaft for moving said ejector shaft rearward upon pulling out said rod.

3. Article dispensing apparatus as set forth in claim 2 wherein said selector means is located in front of said side walls and comprises a plurality of vertically shiftable bars, one for each ejector positioning bar, each engageable on downward movement thereof with the forward end portion of the respective positioning bar to swing the latter down, a plurality of push buttons, one for each vertically shiftable bar, arranged in a vertical series, and means operable on pushing in each button for driving down the respective vertically shiftable bar.

4. Article dispensing apparatus as set forth in claim 3, further comprising means for latching each push button in pushed-in position, and means operable on pulling out the said pull-out rod for releasing said latching means.

5. Article dispensing apparatus as set forth in claim 4 further comprising means operable on pulling out the said pull-out rod after release of said latching means for locking out of operation all the said vertically shiftable bars, said lockout means being movable from a retracted position to a lockout position on pulling out said rod, and returning to retracted position on return of said rod.

6. Article dispensing apparatus as set forth in claim 2 further comprising a latch for locking said rod against operation, means operable on downward movement of any of said ejector positioning bars to release said latch, and a plurality of locking means, one for each of said ejector positioning bars, each adapted to lock the respective positioning bar in raised position upon emptying of the respective column.

7. In a vending machine of the type having a plurality of manually operable primary pull-out rods for dispensing merchandise from a plurality of columns, each of said rods being adapted to be pulled forward through a predetermined stroke from a retracted position and then returned, and a draw bar engageable by each of said primary rods and adapted to be moved forward through a predetermined stroke corresponding to the stroke of each primary rod when any primary rod is pulled out: an auxiliary dispensing unit in said machine, an auxiliarry pull-out rod for actuating said auxiliary unit, said auxiliary rod beng adapted to be pulled out through a stroke substantially longer than the stroke of said primary rods and the draw bar, and means operable by said auxiliary rod when pulled out through its said longer stroke for moving the draw bar forward through its said predetermined stroke.

8. In a vending machine of the type having a plurality of manually operable primary pull-out rods for dispensing merchandise from a plurality of columns, each of said rods being adapted to be pulled forward through a predetermined stroke from a retracted position and then returned, and a draw bar engageable by each of said primary rods and adapted to be moved forward through a predetermined stroke corresponding to the stroke of each primary rod when any primary rod is pulled out: an auxiliary dispensing unit in said machine comprising ejecting means and a pivoted arm coupled to said ejecting means for moving the latter, an auxiliary pull-out rod and a first link connecting said auxiliary pull-out rod and said pivoted arm for actuating said arm on pulling out said auxiliary pullout rod to actuate said ejecting means, a pusher for pushing the draw bar forward, and a second link connecting said pivoted arm and said pusher, the connection of said second link to the pivoted arm being nearer the pivot for said arm than the connection of said first link to the arm, whereby said auxiliary rod is adapted to be pulled out through a stroke substantially longer than the stroke of said draw bar and said primary rods.

9. Article dispensing apparatus comprising a plurality of columns arranged side-by-side for holding stacks of articles, an ejector carrier movable under the columns, a plurality of ejectors, one for each column, each mounted on said carrier for movement from a lowered retracted position below the respective column and a raised ejecting position wherein it is engageable with the lowermost article in the respective column to push said article out of the column, selector means in front of said columns comprising a plurality of vertically shiftable bars, one for each ejector, each adapted on downward movement thereof to raise the respective ejector to its ejecting position, a plurality of push buttons, one for each vertically shiftable bar, arranged in a vertical series, means operable on pushing in each button for driving down the respective vertically shiftable bar, a manually operable pull-out rod, and means connecting said rod to said carrier for moving said carrier.

10. Article dispensing apparatus as set forth in claim 9 further comprising means for latching each push button in pushed-in position, and means operable on pulling out the said pull-out rod for releasing said latching means.

11. Article dispensing apparatus as set forth in claim 10 further comprising means operable on pulling out the said pull-out rod after release of said latching means for locking out of operation all the said vertically shiftable bars, said lockout means being movable from a retracted position to a lockout position on pulling out said rod, and returning to retracted position on return of said rod.

12. Article dispensing apparatus comprising a plurality of columns arranged side-by-side for holding stacks of articles, an ejector carrier movable under the columns, a manually operable member movable away from and back to a retracted position for manually moving said carrier, a plurality of ejectors, one for each column, each mounted on said carrier for movement from a lowered retracted position below the respective column and a raised ejecting position wherein it is engageable with the lowermost article in the respective column to push said article out of the column on actuation of said manually operable member, selector means comprising a plurality of shiftable members, one for each ejector, each adapted on movement thereof to raise the respective ejector to its ejecting position, a plurality of push buttons, one for each shiftable member, means operable on pushing in each button for moving the respective shiftable member to raise the respective ejector, each button being biased to return outward, means for latching any one of said push buttons in pushed-in position, said latching means being releasable on pushing in any other button to release said one button to return outward, and means operable on actuation of said manually operable member for releasing said latching means to allow any pushed-in button to return outward.

13. Article dispensing apparatus as set forth in claim 12 further comprising means operable on actuation of said manually operable member after release of said latching means for locking out of operation all the said shiftable members, said lockout means being movable from a retracted position to a lockout poistion on movement of said manually operable member away from its retracted position and returning to retracted position on return of said manually operable member to retracted position.

14. Article dispensing apparatus as set forth in claim 12 further comprising means responsive to emptying of any column to render the respective push button ineffective to raise the respective ejector.

References Cited in the file of this patent

UNITED STATES PATENTS

| | | |
|---|---|---|
| 776,893 | Davis | Dec. 6, 1904 |
| 947,755 | Peters | Jan. 25, 1910 |
| 982,812 | Grover | Jan. 31, 1911 |
| 1,566,626 | Steele | Dec. 22, 1925 |
| 1,925,685 | Antoine | Sept. 5, 1933 |
| 1,951,746 | Bonaccolta | Mar. 20, 1934 |
| 2,207,902 | Steiner | July 16, 1940 |
| 2,593,102 | Caruso | Apr. 15, 1952 |
| 2,650,149 | Munz | Aug. 25, 1953 |